United States Patent
Wen

(10) Patent No.: US 9,303,706 B2
(45) Date of Patent: Apr. 5, 2016

(54) HEAT-DISSIPATION STRUCTURE OF BRAKE PAD

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 0 days.

(21) Appl. No.: 14/214,972

(22) Filed: Mar. 16, 2014

(65) Prior Publication Data

US 2015/0176669 A1    Jun. 25, 2015

(30) Foreign Application Priority Data

Dec. 20, 2013   (TW) .............................. 102147411 A

(51) Int. Cl.
| | |
|---|---|
| *F16D 65/78* | (2006.01) |
| *F16D 65/80* | (2006.01) |
| *F16D 65/84* | (2006.01) |
| *F16D 65/092* | (2006.01) |
| *F16D 65/847* | (2006.01) |

(52) U.S. Cl.
CPC .............. *F16D 65/84* (2013.01); *F16D 65/092* (2013.01); *F16D 65/847* (2013.01); *F16D 2065/789* (2013.01)

(58) Field of Classification Search
CPC ........... B62L 3/02; B62L 3/023; B62L 3/026; F16D 65/78; F16D 65/80; F16D 65/807; F16D 65/84; F16D 65/847; F16D 2065/789

USPC .................................. 188/264 A, 264 R, 71.6
See application file for complete search history.

(56) References Cited

U.S. PATENT DOCUMENTS

| | | | | | |
|---|---|---|---|---|---|
| 3,277,985 | A | * | 10/1966 | Caskey ................... | 188/264 AA |
| 4,036,333 | A | * | 7/1977 | Mathauser ................ | 188/264 A |
| 4,441,592 | A | * | 4/1984 | Everett ...................... | 188/264 A |
| 6,068,090 | A | * | 5/2000 | Chen et al. ............... | 188/24.22 |
| 6,206,151 | B1 | * | 3/2001 | Nakamura ............... | 188/250 B |
| 7,905,335 | B2 | * | 3/2011 | Demers ..................... | 188/264 R |
| 8,550,220 | B2 | * | 10/2013 | Iwai et al. ................. | 188/264 A |
| 8,869,956 | B2 | * | 10/2014 | Wen .......................... | 188/264 R |
| 2014/0060984 | A1 | * | 3/2014 | Tseng et al. .............. | 188/251 R |
| 2015/0090543 | A1 | * | 4/2015 | Moore ....................... | 188/250 G |

FOREIGN PATENT DOCUMENTS

| | | | |
|---|---|---|---|
| DE | 202013104619 U1 | * | 12/2013 |
| FR | 2853378 A1 | * | 10/2004 |

\* cited by examiner

*Primary Examiner* — Thomas J Williams

(57) ABSTRACT

A heat-dissipation structure of brake pad includes a main plate. The main plate has a first heat-dissipation portion at a first end and a second heat-dissipation portion at a second end. The first heat-dissipation portion includes a plurality of heat-dissipation pillars protruded from the main plate. The second heat-dissipation portion includes a plurality of protrusions or recesses formed on the main plate. The main plate has a brake pad on a face thereof opposite to the heat-dissipation pillars. The brake pad is located between the first and the second heat-dissipation portions. When the main plate is disposed on a caliper body, the first and the second heat-dissipation portions are exposed at two ends of the caliper body respectively to increase heat-dissipation area.

1 Claim, 5 Drawing Sheets

HEAT-DISSIPATION STRUCTURE OF BRAKE PAD

BACKGROUND OF THE INVENTION

1. Field of the Invention

The present invention is related to a heat-dissipation structure of brake pad.

2. Description of the Prior Art

Disk brake is widely used in bicycles. A typical disk brake system includes two brake pads which are able to clamp a rotating brake disk to inhibit the brake disk from rotating. However, a large amount of heat is generated, and friction force between the brake pads and the brake disk may reduce due to heat. As a result, performance of braking may be reduced to result dangers.

A conventional heat-dissipation structure for brake pads is disclosed in publication TW 200951017. The heat-dissipation protector has a brake lining on a face and a heat-resistant material on the other face. The heat-resistant material can inhibit heat generated by the brake lining from conducting to the brake system. However, the structure can only inhibit the heat from reaching the brake system but not dissipate the heat out. In addition, conventional heat-dissipation plates dissipate heat with a single end. As a result, heat is dissipated unevenly, so the heat-dissipation plates may distort due to heat.

SUMMARY OF THE INVENTION

The main object of the present invention is to provide a heat-dissipation structure of brake pad which is able to improve heat-dissipation efficiency.

To achieve the above and other objects, a heat-dissipation structure of brake pad of the present invention is adapted for being disposed on a caliper device. The caliper device includes a caliper body having a receiving room formed through the caliper body. The receiving room has a constant volume. The heat-dissipation structure of the present invention includes a main plate.

The main plate has a first face and an opposite second face. The main plate has a first heat-dissipation portion at a first end and a second heat-dissipation portion at a second end. The first heat-dissipation portion includes a plurality of heat-dissipation pillars protruded from the first face. The second heat-dissipation portion includes a plurality of elongated ribs protruded from one of the first face and the second face. The main plate further has a brake pad on the second face. The brake pad is between the first heat-dissipation portion and the second heat-dissipation portion. When the main plate is disposed on the caliper body, the main plate penetrates the receiving room, and the first heat-dissipation portion and the second heat-dissipation portion are exposed out of the caliper body at two ends of the caliper body respectively. The brake pad is located in the receiving room.

Thereby, due to the first and the second heat-dissipation portions, surface area of the main plate exposed to air is increased so that the heat-dissipation efficiency is promoted.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
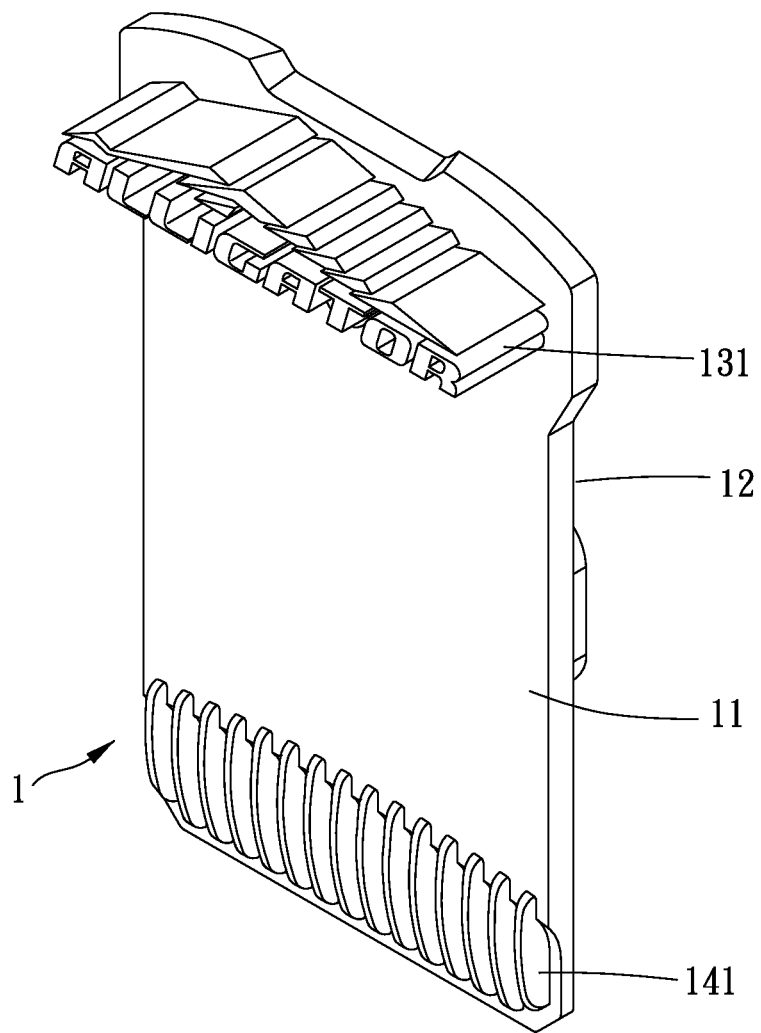
FIG. 1 is a stereogram showing a first embodiment of the present invention.
Figure 2:
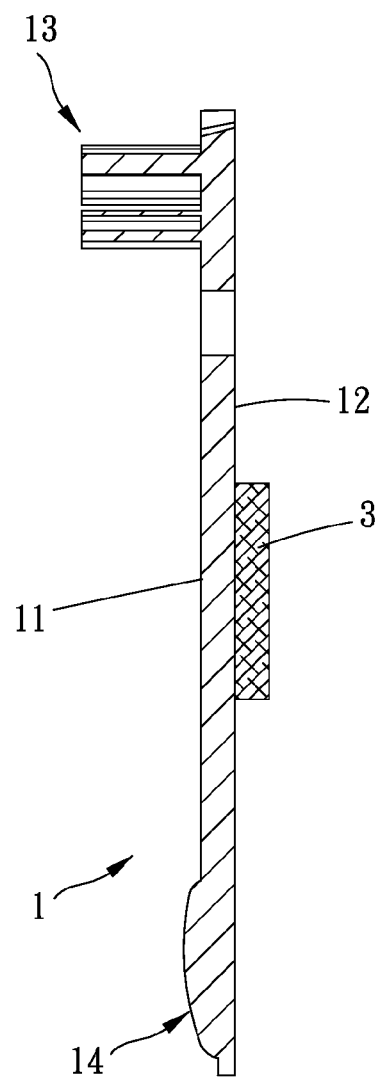
FIG. 2 is a profile showing a first embodiment of the present invention.
Figure 3:
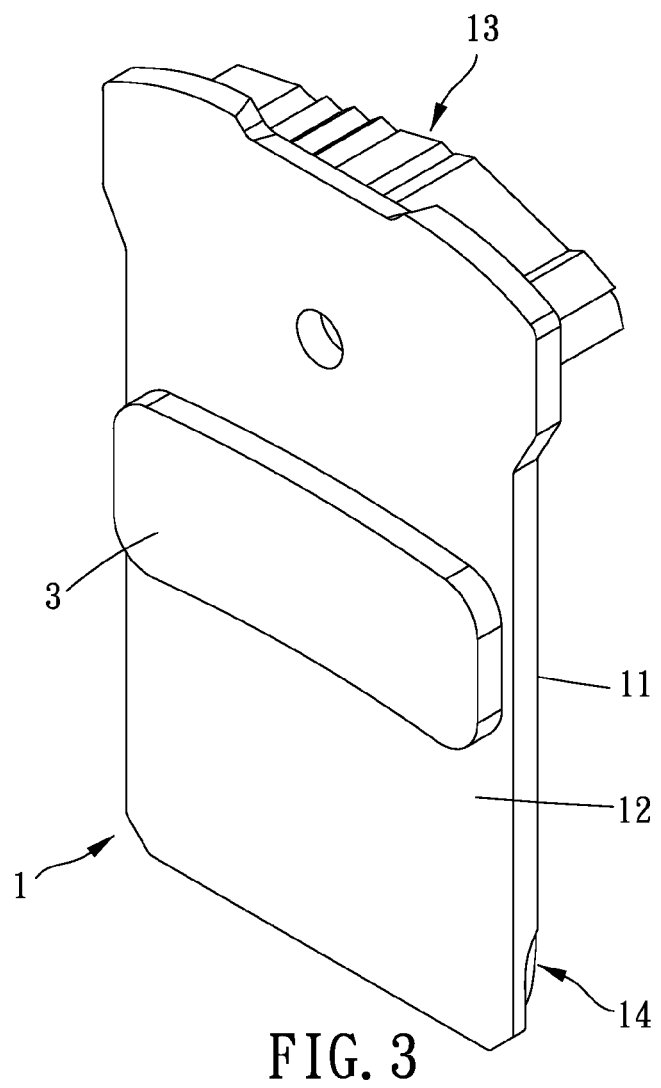
FIG. 3 is a stereogram at another angle showing a first embodiment of the present invention.
Figure 4:
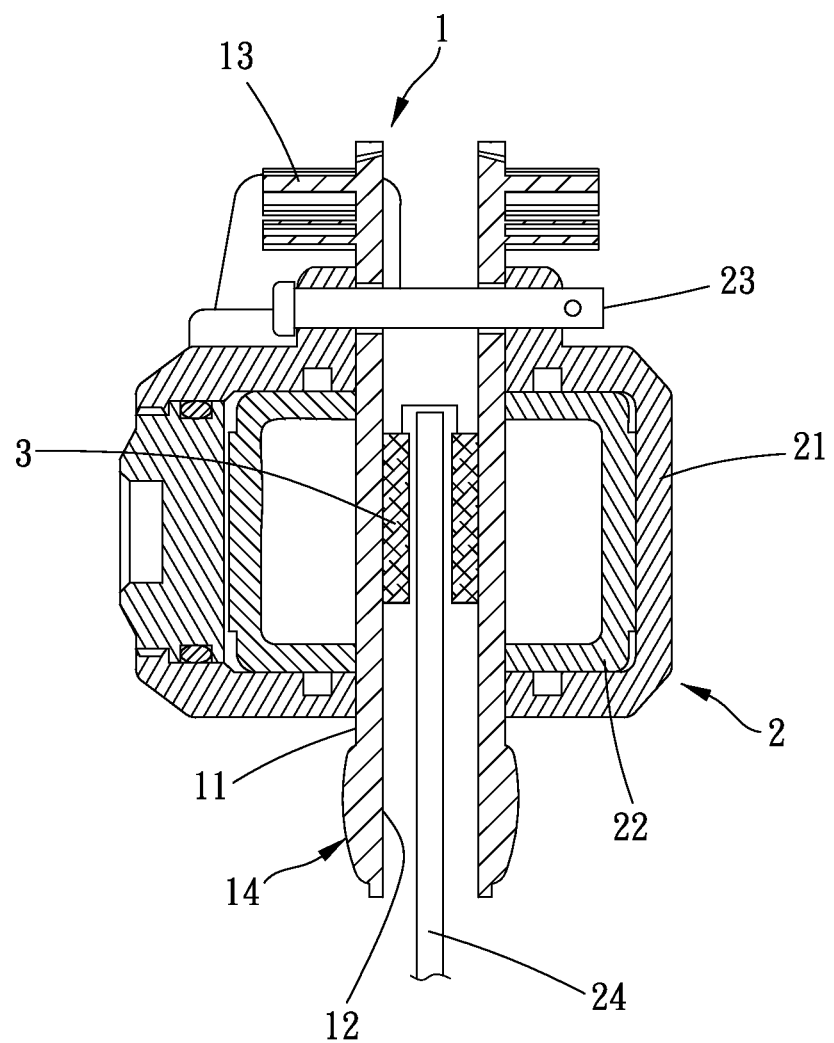
FIG. 4 is an illustration showing a first embodiment of the present invention.

Please refer to FIG. 1 to FIG. 4 for a first embodiment of the present invention. The heat-dissipation structure of brake pad is adapted for being disposed on a caliper device 2. The caliper device 2 includes a caliper body 21 having a receiving room formed through the caliper body 21. The receiving room has a constant volume. That is, the volume of the receiving room does not change following the operation of the caliper device 2. The heat-dissipation structure of the present invention includes a main plate 1.

The main plate 1 has a first face 11 and an opposite second face 12. The main plate 1 has a first heat-dissipation portion 13 at a first end and a second heat-dissipation portion 14 at a second end opposite to the first end. Specifically, a first direction is defined from the first end to the second end. The first heat-dissipation portion 13 includes a plurality of heat-dissipation pillars 131 protruded from the first face 11 of the main plate 1 to increase contacting area between the main plate 1 and air. The second heat-dissipation portion 14 includes a plurality of protrusions protruded from at least one of the first face 11 and the second face 12 of the main plate 1. In the present embodiment, each protrusion is an elongated rib 141. That is, the second heat-dissipation portion 14 includes a plurality of elongated ribs 141 formed on the first face 11 or/and the second face 12 of the main plate 1. The elongated ribs 141 are spacedly arranged along a second direction which is perpendicular to the first direction. Preferably, extending direction of each elongated rib 141 is parallel to the first direction. That is, longitudinal direction of each elongated rib 141 is parallel to the first direction.

Figure 5:
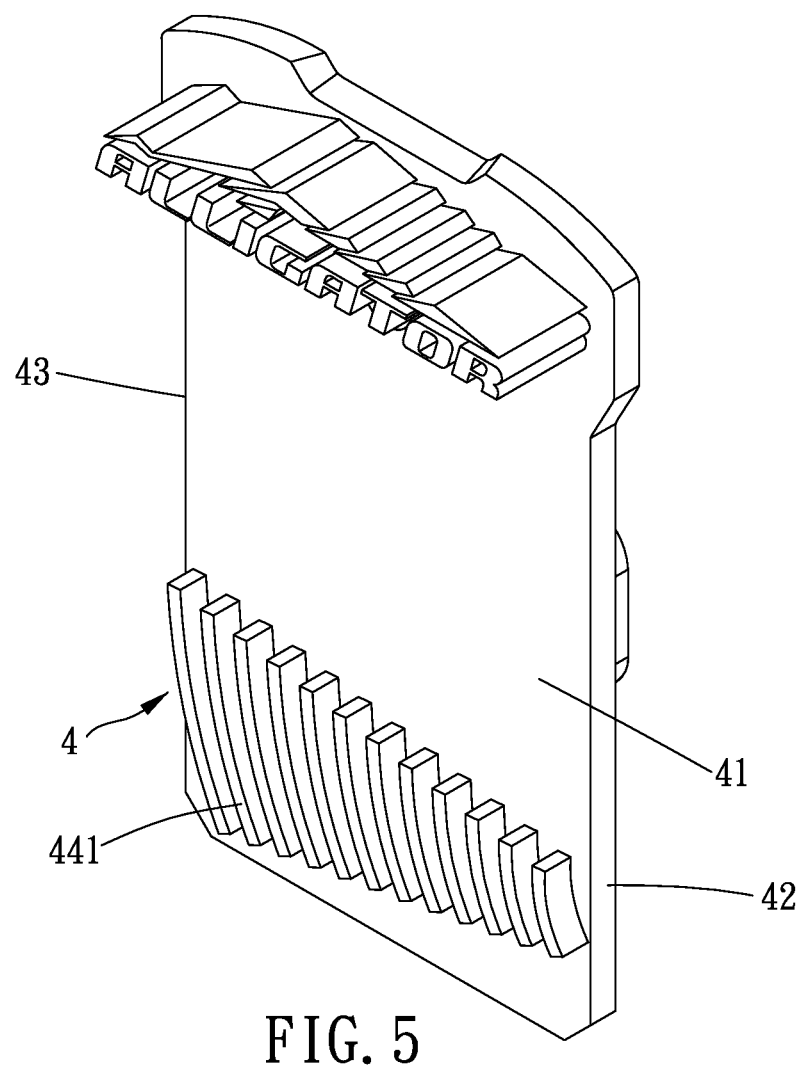
FIG. 5 is a stereogram showing a second embodiment of the present invention.
Figure 5A:
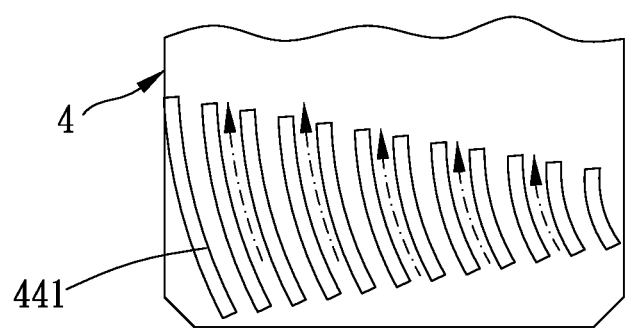
FIG. 5A is a partial enlargement showing a second embodiment of the present invention.

In other possible embodiment, the second heat-dissipation portion can be alternated. For example, referring to FIG. 5 and FIG. 5A, an imaginary line defined by two ends of each elongated rib 441 along its extending direction is not parallel to the first direction. That is, longitudinal direction of each elongated rib 441 is unparallel to the first direction. In the present embodiment, each elongated rib 441 extends from bottom-right to top-left of the first face 41 of the main plate 4. More specifically, the main plate 4 has a third end 42 and a fourth end 43 along the second direction. The elongated ribs 441 are spacedly arranged along the second direction, and lengths of the elongated ribs 441 increase from the third end 42 to the fourth end 43.

The grinding device 10 is adapted for blending and grinding soybeans with water to form bean dregs and raw bean pulp. Specifically, soybeans and water are grinded by the grinding device 10 to form mud-like bean pulp, and the mud-like bean pulp is further filtered into bean dregs and raw bean pulp by a centrifugal filter wherein the bean dregs are discharged.

The bean supplier 20 is adapted for supplying a predetermined amount of soybeans to the grinding device 10. In the present embodiment, the bean supplier 20 includes a vacuum bean sucking device 21 and a bean dosing device 22. The vacuum bean sucking device 21 sucks soybeans into the bean dosing device 22 by a vacuum motor, and the bean dosing device 22 is adapted for supplying a predetermined amount of soybeans to the grinding device 10.

The steamer 30 is adapted for boiling the raw bean pulp made by the grinding device 10 to form bean pulp. If necessary, water can be added into the steamer to adjust the concentration of the bean pulp. In the present embodiment, the steamer 30 includes a cover 31 whose top is formed with a recessed conical collecting trough. The cover 31 is formed with a lower backflow hole 32 and a higher overflow hole 33, and a blocking plate 34 is disposed beside the overflow hole 33 to prevent the bean pulp from splashing. The backflow hole 32 is connected with a tube which extends toward the inside of the steamer 30. Thereby, bubbles overflows out via the overflow hole and becomes liquid. The liquid further flows back into the steamer 30 via the backflow hole 32 so that the bubbles may not spill.

The stirring tank 40 is adapted for stirring and blending the bean pulp and the coagulator to form soy custard. In the present embodiment, the stirring tank 40 includes a first stirring device 41, a plurality of tanks 42, and a rotary platform 43. The tanks are arranged around a rotary axis of the rotary platform 43. A distance from an end of each elongated rib 441 near the second end of the main plate 4 to the second end of the main plate 4 is tapered from the third end 42 to the fourth end 43 of the main plate 4. As a result, when air flows from the third end to the fourth end during operation, a face of each elongated rib facing the third end is able to block air and to guide air toward the first end of the main plate 4 so as to cool down the caliper body 21. In addition, each elongated rib 441 is arc-shaped to further guide air smoothly. In other possible embodiments, the second heat-dissipation portion can include a plurality of elongated ribs formed on the second face wherein each elongated rib obliquely extends from bottom-left to top-right of the second face. Thereby, when air flows from the third end toward the fourth end, a face of each elongated rib facing the third end is able to block air and to guide air to the first end so as to cool the brake pad down.

Figure 6:
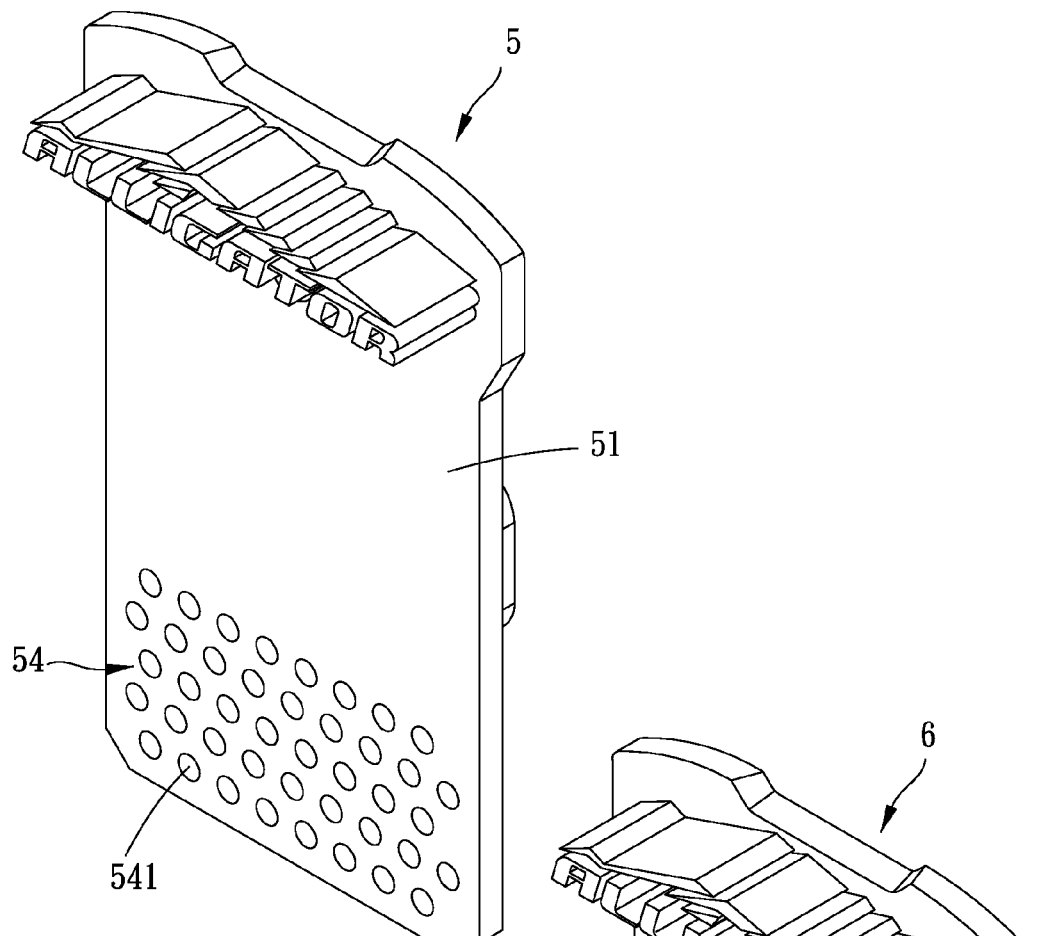
FIG. 6 is a stereogram showing a third embodiment of the present invention.
Figure 7:
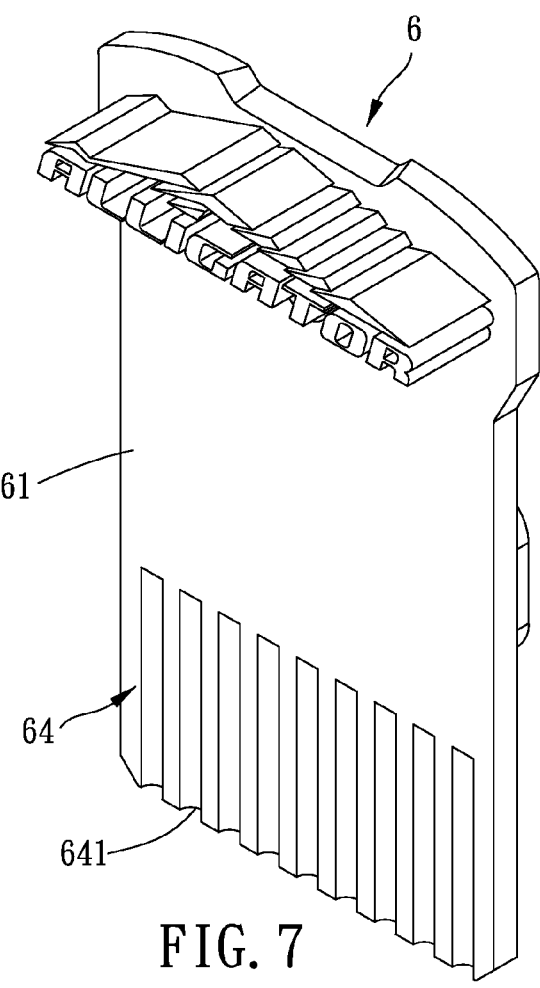
FIG. 7 is a stereogram showing a fourth embodiment of the present invention.

An alternated embodiment is also shown in FIG. 6 and FIG. 7. The second heat-dissipation portion 54, 64 includes a plurality of recesses formed on at least the first face 51, 61 of the main plate 5, 6. The recesses are spacedly arranged along the second direction perpendicular to the first direction. Extending direction of each recess is parallel to the first direction. In other possible embodiments, the extending direction of each recess can be unparallel to the first direction. Practically, each recess can be a through hole 541 (as shown in FIG. 6) or a groove 641 (as shown in FIG. 7).

Please refer to FIG. 1 to FIG. 4. The main plate 1 has a brake plate 3 on the second face 12 wherein the brake pad 3 is located between the first heat-dissipation portion 13 and the second heat-dissipation portion 14. The brake pad 3 is adapted for clamping a brake disk 24. When the main plate 1 is disposed on the caliper body 21, the main plate 1 penetrates the receiving room. The first heat-dissipation portion 13 and the second heat-dissipation portion 14 are exposed out of the caliper body 21 at two ends of the caliper body 21 respectively, and the brake pad 3 is located in the receiving room. Practically, the brake pad 3 is made of material for friction.

In use, two main plates 1 are installed onto the caliper device 2 with a pin 23. Each main plate 1 is partially received in the receiving room of the caliper body 21, and the second face 12 of each main plate 1 faces the second face 12 of the other main plate 1. The first heat-dissipation portion 13 and the second heat-dissipation portion 14 of each main plate 1 are exposed out of the caliper body 21 at two ends of the caliper body 21 respectively to increase contacting area to air. The caliper device 2 further includes two pistons 22. When a brake device is pressed by a user, the two pistons 22 push the two main plates 1 to make them closer to each other so that the brake pads 3 of the two main plates 1 can clamp the rotating brake disk 24 to inhibit the brake disk 24 from rotating. When the rotating brake disk 24 is clamped by the brake pads 3, a large amount of heat is generated due to friction so that performance of braking may be reduced. However, the heat-dissipation pillars of the first heat-dissipation portion 13 and the elongated ribs 141 of the second heat-dissipation portion 14 of the present invention are exposed out of the caliper body 21 so as to conduct and dissipate the heat. In the present invention, two pathways for conducting heat of the brake pads 3 are provided. In addition, heat may not accumulate at a single end of the main plate 1 due to the first and the second heat-dissipation portions 13, 14. Thus, the main plate 1 may not distort due to heat.

What is claimed is:

1. A heat-dissipation structure of brake pad, adapted for being disposed on a caliper device wherein the caliper device includes a caliper body having a fixed-volume receiving room formed through the caliper body, the heat-dissipation structure of brake pad includes:

a main plate, having a first face and an opposite second face, the main plate having a first heat-dissipation portion at a first end and a second heat-dissipation portion at a second end, the first heat-dissipation portion including a plurality of heat-dissipation pillars protruded from the first face, the second heat-dissipation portion including a plurality of protrusions protruded from at least one of the first face and the second face, the main plate having a brake pad on the second face, the brake pad being located between the first heat-dissipation portion and the second heat-dissipation portion, when the main plate is disposed on the caliper body, the main plate penetrates the receiving room, the first heat-dissipation portion and the second heat-dissipation portion are exposed outside the caliper body at two ends of the caliper body respectively, and the brake pad is received in the receiving room;

wherein the first face is for being pushed by a piston in a direction perpendicular to the first face, and the second face is for attachment of the brake pad;

wherein each of the heat-dissipation pillars and each of the protrusions protrude in the direction perpendicular to the first face;

wherein a first direction is defined from the first end to the second end of the main plate, each protrusion is an elongated rib, the elongated ribs are spacedly arranged along a second direction, the second direction is perpendicular to the first direction;

wherein an imaginary line defined by the two ends of each elongated rib along an extending direction of the elongated rib is unparallel to the first direction, each elongated rib obliquely extends from a bottom-right side to an upper-left side of the first face of the main plate, the main plate has a third end and an opposite fourth end along the second direction, a distance from an end of each elongated rib near the second end of the main plate to the second end of the main plate is tapered from the third end to the fourth end of the main plate.

* * * * *